March 20, 1956  H. H. BROOKS  2,738,729
METHOD FOR TRIMMING AND SLITTING WEBS
Filed March 19, 1952  6 Sheets-Sheet 1

INVENTOR
HAROLD H. BROOKS
BY Toulmin & Toulmin
ATTORNEYS

March 20, 1956   H. H. BROOKS   2,738,729
METHOD FOR TRIMMING AND SLITTING WEBS
Filed March 19, 1952   6 Sheets-Sheet 3
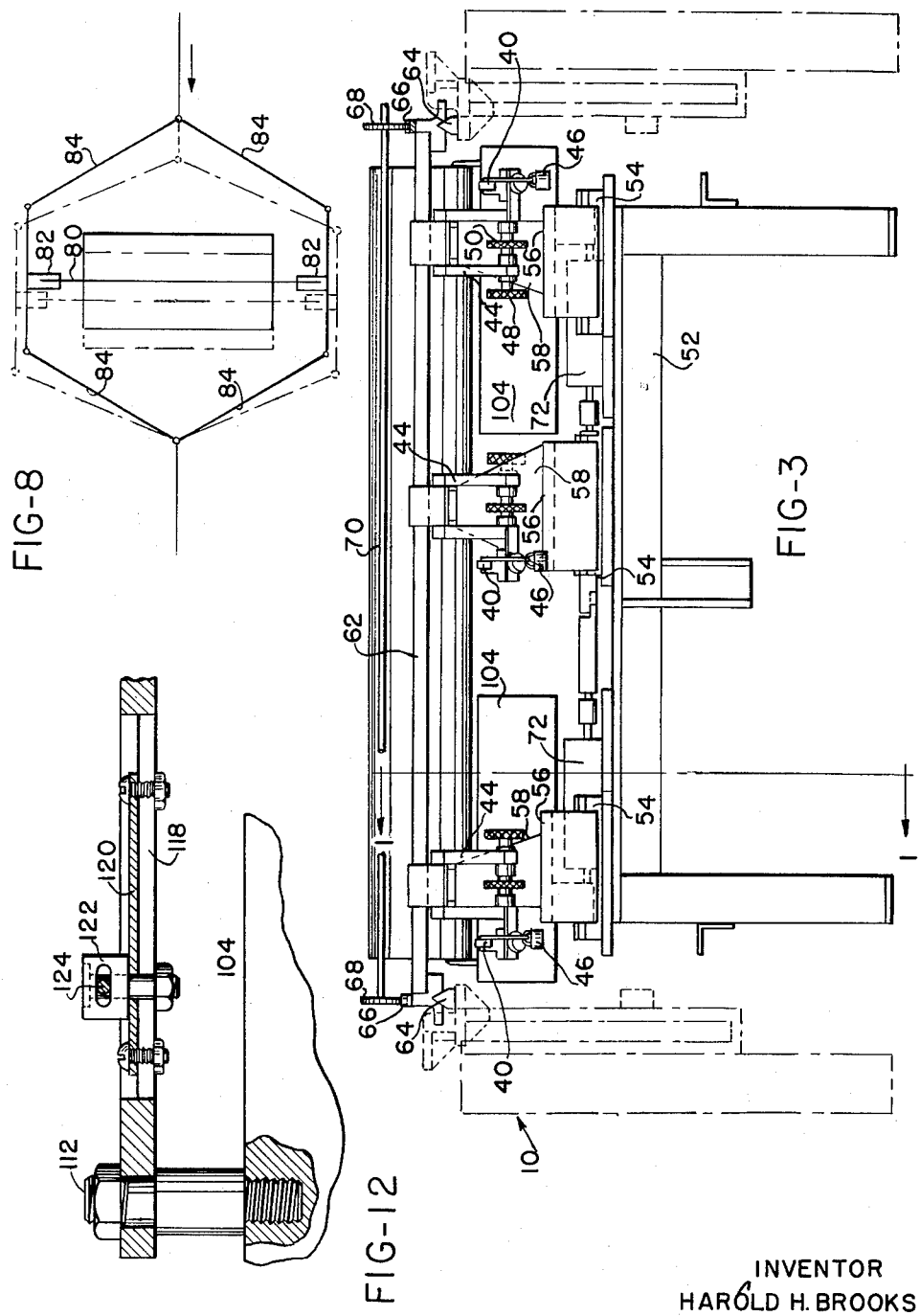
INVENTOR
HAROLD H. BROOKS
BY Toulmin & Toulmin
ATTORNEYS

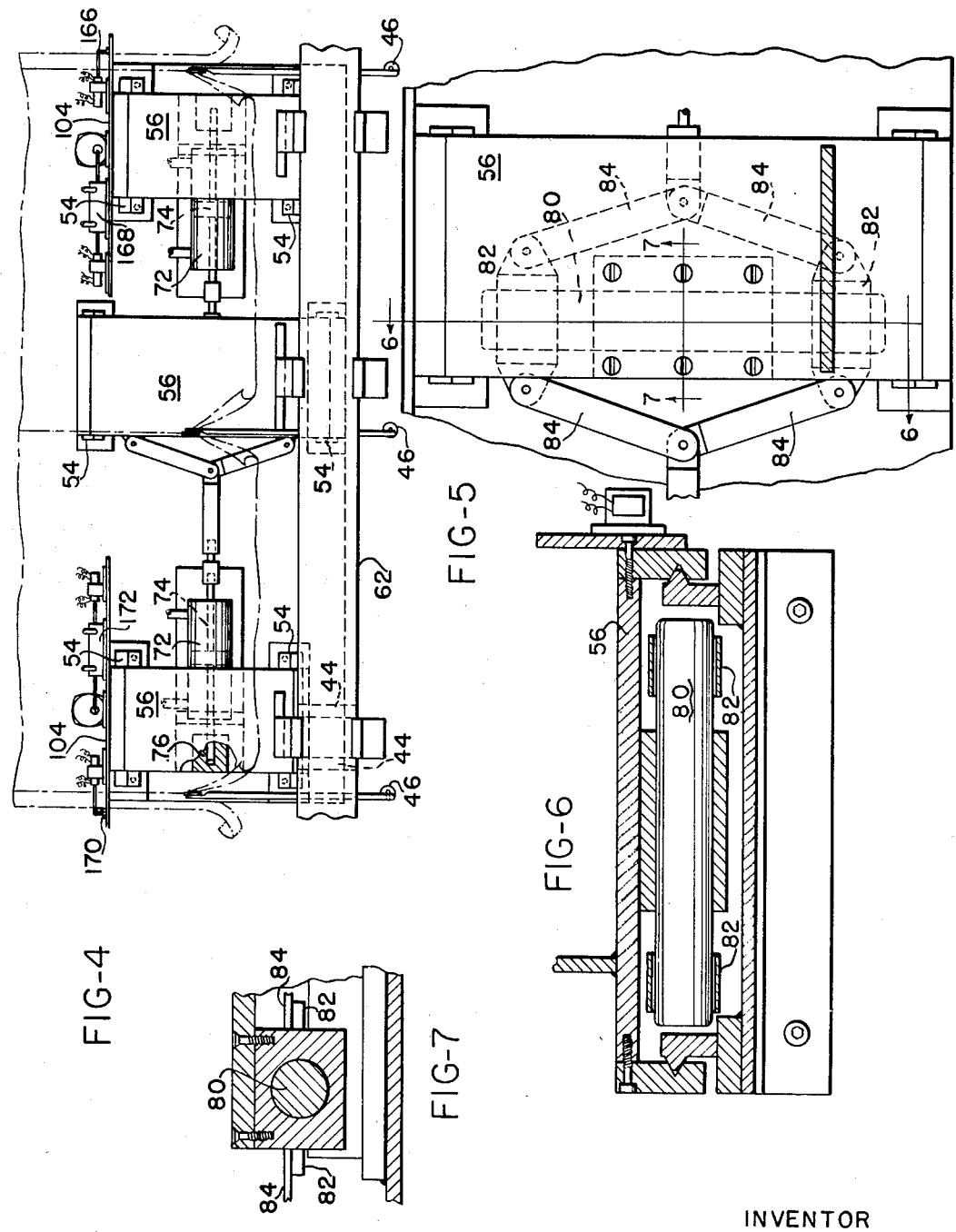

March 20, 1956     H. H. BROOKS     2,738,729
METHOD FOR TRIMMING AND SLITTING WEBS
Filed March 19, 1952     6 Sheets-Sheet 5
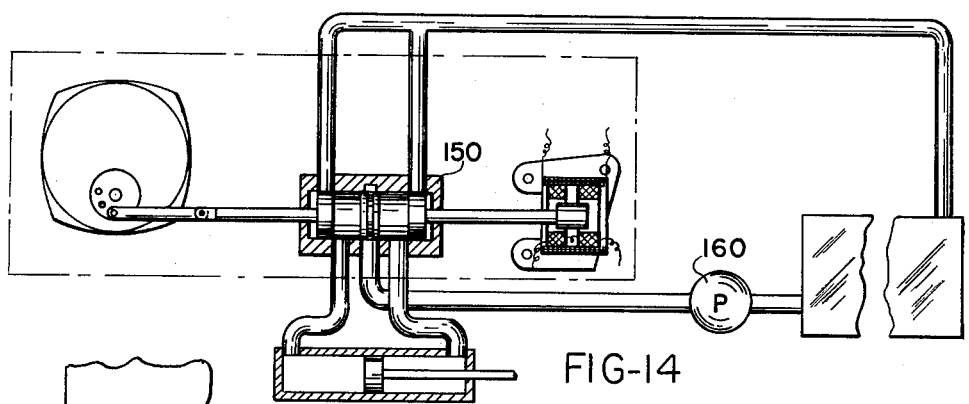
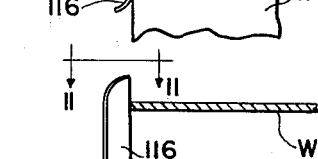
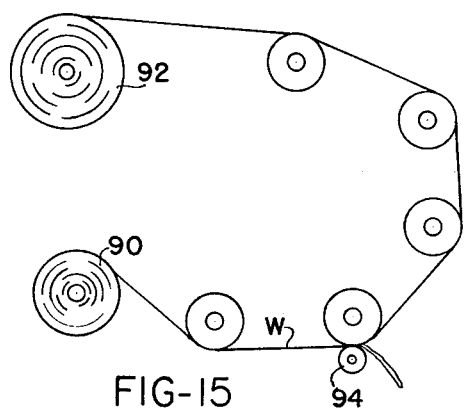
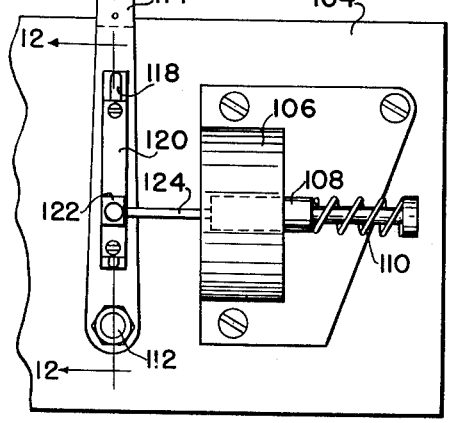
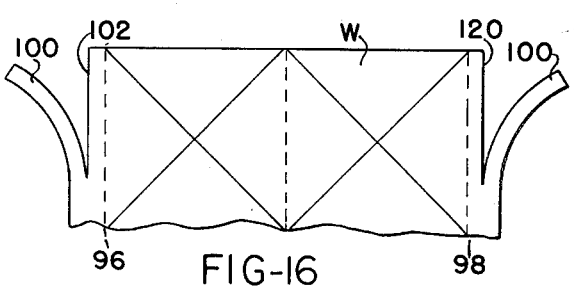
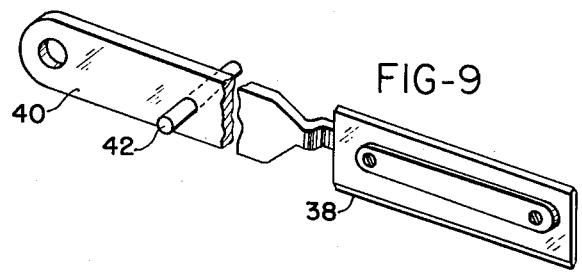
INVENTOR
HAROLD H. BROOKS
BY Toulmin & Toulmin
ATTORNEYS INVENTOR
HAROLD H. BROOKS
BY Toulmin & Toulmin
ATTORNEYS United States Patent Office 2,738,729
Patented Mar. 20, 1956

2,738,729

METHOD FOR TRIMMING AND SLITTING WEBS

Harold H. Brooks, Columbus, Ohio, assignor to Columbus Coated Fabrics Corporation, Columbus, Ohio, a corporation of Ohio Application March 19, 1952, Serial No. 277,401

2 Claims. (Cl. 101—227)

This invention relates to a method and apparatus for trimming and slitting webs and is generally similar to the apparatus disclosed in my co-pending application Serial Number 245,100, filed September 5, 1951, now U. S. Patent No. 2,705,049, but is an improvement thereover.

The work member which the device according to the present invention is adapted for operating comprises an elongated web of coated fabric, particularly material for a wall covering. These webs of fabric are made up in lengths of up to 2400 yards, and heretofore have been produced in four foot widths with a trimming strip along each edge. Due to the extreme width of the strip and the necessity for exact trimming preparatory to hanging the strip, the use of this wall covering has heretofore largely been restricted to skilled persons. A substantially larger market can be opened up, however, and the hanging of the covering made easier if the product can be brought out in two foot widths and already trimmed to exact size.

With this general objective in view, the device disclosed in the co-pending application referred to above was developed and put into operation, and, while it accomplished an eminently satisfactory job of making a clean and sharp incision in the web, it was found to be lacking in trimming and slitting to close enough limits to insure a proper product. This fault came about because it was found that the webs of material varied somewhat in width along their lengths and any fixed trimming arrangement would thus result in a trimmed strip where the trim line did not exactly match the printed pattern.

In general, the variation in width of the web came about on account of shrinkage at certain points therealong, as, for example, in the area where two pieces of the fabric being coated were joined together. This variation in width of the strip quantitatively is a relatively minor matter, and, further, the rate of variation is slight, and because of this a printed web trimmed to the proper line with reference to the pattern can always be hanged properly, due to the inherent flexibility of the material.

Having the foregoing in mind, this invention has for its primary object a method and apparatus for trimming and slitting webs of the nature described, particularly printed webs, such that the difficulties referred to above are entirely eliminated and the resulting product is always trimmed to a precise line relative to the printed pattern thereon.

Another object is the provision for a method and apparatus for trimming and slitting webs which is rapid in operation, and wherein the machine is easy to set up.

A still further object is the provision of a method and apparatus for printing a web in such a manner that it is particularly adapted for use in a web trimming and slitting machine according to this invention.

These and other objects and advantages will become more apparent upon reference to the following description taken in connection with the accompanying drawings, in which:

Figure 3 is a front elevation of the machine;

Figure 4 is a partial plan view of the machine at the cutting end thereof;

Figure 5 is a fragmentary view showing the center part of Figure 4 at enlarged scale;

Figure 6 is a sectional view on line 6—6 on Figure 5;

Figure 7 is a sectional view on line 7—7 of Figure 5;

Figure 8 is a diagrammatic view showing the manner in which a pantograph arrangement forming a part of this invention operates;

Figure 9 is a perspective view showing a trimming and slitting knife for use in the machine;

Figure 10 is a plan view showing a typical feeler member forming a part of the control system of this invention;

Figure 11 is a view looking in at the end of the feeler arrangement in Figure 10, and is indicated by line 11—11 on Figure 10;

Figure 12 is a section indicated by line 12—12 on Figure 10;

Figure 14 is a diagrammatic representation of the hydraulic system that is under the control of the feeler and its associated electric circuit;

Figure 15 is a diagrammatic representation of the printing of a web according to the present invention;

Figure 16 is a diagrammatic representation of a printed web showing the manner in which the web is trimmed at the time of printing;

Figure 1:
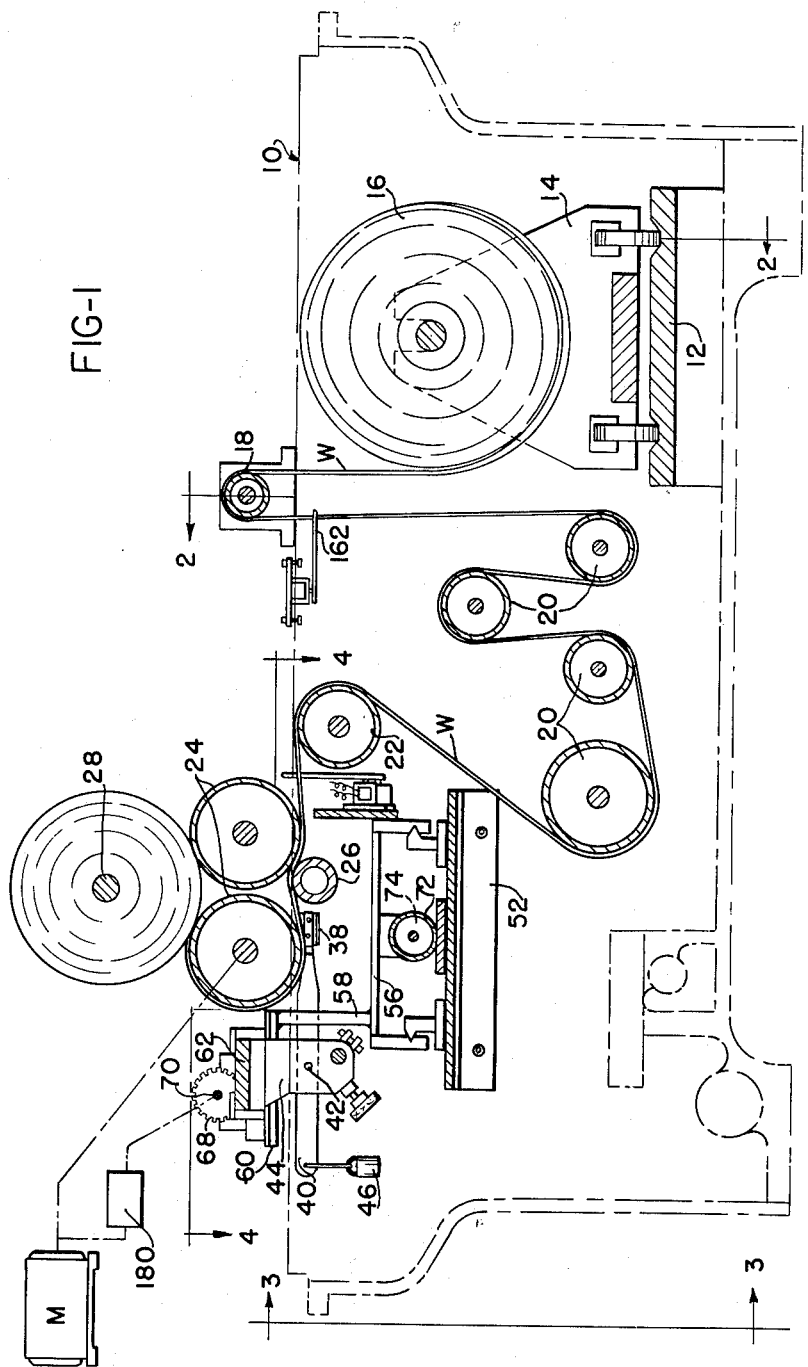
Figure 1 is a side view of a machine according to this invention with the frame of the machine indicated in dot-dash outline.

Referring to the drawings somewhat more in detail, the machine of this invention comprises a frame, generally represented at 10, and comprising at the one end means 12 forming tracks for supporting a carriage 14 for lateral movement in the frame. Carriage 14 is adapted for receiving a roll 16 of the material to be trimmed and slit. The web of material, represented by letter W leads from roll 16 over a first roller 18, and then over a plurality of idler rollers 20 distributed about the frame of the machine, and which preferably include means for maintaining a predetermined tension on the web. The web W then leads over another idler roller 22, and then passes underneath a pair of relatively large rollers 24 and is held thereagainst by a fairly small intermediate roller 26 beneath the web. After passing over the rollers 24, the web is wound on a suitable receiving spindle 28.

Figure 2:
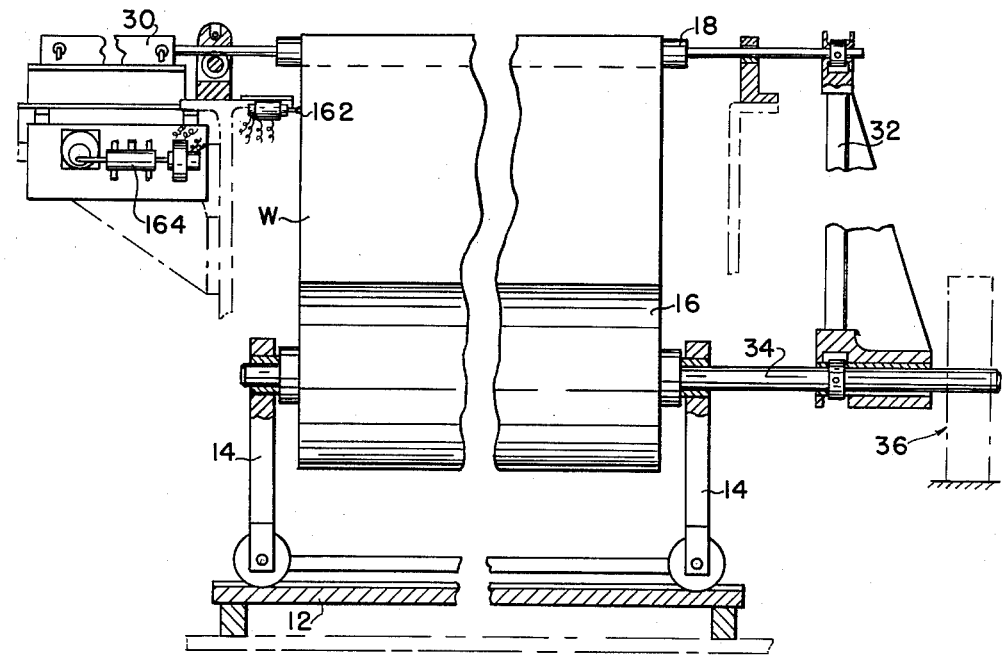
Figure 2 is a vertical section, indicated by line 2—2 on Figure 1, showing the appearance of the machine from the rear.

As will be seen in Figure 2, the roller 18 is laterally shiftable in the frame of the machine by means of hydraulic cylinder and piston 30 connected to one end of the supporting shaft for the said roller and the other end of the said shaft connected by a bracket 32 to shaft 34 of the supply roll 16, so that lateral shifting movements of roller 18 will be accompanied by equal lateral shifting movements of the supply roll.

In cooperation with the means associated with the rollers 20 for maintaining a predetermined tension of the web, shaft 34 may include a braking means, generally illustrated at 36, for applying a predetermined braking effect on the said shaft.

Associated with the left-hand one of rollers 24, as viewed in Figure 1, are a plurality of cutting blades 38 which are in the form of extra-long razor blades mounted on the ends of arms 40, each of which is pivoted at 42 to a suitable supporting framework 44, and so biased by a weight 46 that the cutting blade is pressed toward the roller 24.

As will be seen in Figure 3, the arms 40 are actually supported to one side of their supporting brackets 44, and are shiftable laterally in their respective brackets by the adjustable screw 48, and can be clamped in position by the clamp nut 50.

In Figures 1 and 3 through 5, it will be noted that underneath rollers 24 extending transversely in the frame of the machine is a rigid table or platform 52. This platform 52 has fixed thereto upstanding guide rails 54 which slidably receive the slides 56, and each of which slides is rigidly connected with an upstanding support plate 58 that has at its upper end a horizontal slide portion 60 extending leftwardly therefrom, as viewed in Figure 1.

Slide portion 60 of each of the upstanding parts 58 of the slides 56 is associated with one of the cutter knife supporting brackets 44. The said brackets 44 are supported on the slide parts 60 for movement thereon and are likewise slidably engaged by a transverse bar 62, so that the knife supporting brackets 44 will all slide in unison. The plate 62 is supported at each end by the rails 64 and also adjacent each end are the racks 66 engaged by the gears 68 that are interconnected by shaft 70. The purpose of this arrangement is so that during operation of the machine shaft 70 can be rotated slowly, and this will gradually shift the cutting blades in the direction of their length, thus continuously presenting a clean and sharp cutting edge to the web being trimmed and slit, so that at all times a perfectly sharp cut is obtained.

At the same time, the brackets 44 are slidable longitudinally of the rail or bar 62 independently of each other.

Associated with the two end slides 56 are hydraulic cylinders 72 within which are mounted double acting pistons 74, each of which has rods extending out both ends of the associated cylinder. The outer one of each of the rods is connected with the adjacent slide 56 by means of an independent block 76 thereon, as will be seen in both Figures 3 and 4. As the pistons move in the cylinders, the associated slides are thus also moved.

The center slide takes a motion different from the two end slides for the reason that the knife associated therewith must always be exactly half-way between the two outer knives. For this reason, the center slide is connected so that it takes one half the movement of each of the end slides, and in the same sense, whereby once adjusted so its knife is midway between the two outer knives, it will remain in an exactly centered position throughout all adjusting movements of the end slides.

According to this invention, this is accomplished by supporting beneath the center slide a bar or rod 80, and on each end of which is slidable a yoke 82. Each yoke 82 is connected with the adjacent inner rod of one of the pistons 74 by a link 84. The resulting arrangement is illustrated in Figure 5, and the operation thereof is diagrammatically illustrated in Figure 8.

In these figures, it will be seen that the movement of either of the pistons 74 in either direction will be accompanied by a movement of the center slide in the same direction, but only half the amount.

In the preparation of the web for being operated by the web slitter and trimmer, it is printed in the usual manner, and at the time of the final printing, the web is trimmed a predetermined distance outwardly from the outer edge of the printed pattern. Thus, should shrinkage or streching of the web occur after the printing has been applied, the trimmed outer edge will always be the same distance from the edge of the printed pattern, and thus provide a reliable guide means when the web is delivered to the trimming and slitting machine.

Figure 15 represents very diagrammatically the passage of the web W from a supply roll 90 through a printing press to a take-up roll 92. During the passage of the web through the press, it is printed at various stations, and at a selected station trimming rollers, as at 94, are provided which are fixed in the printing machine relative to the edge of the pattern being printed. The result of this operation is diagrammatically illustrated in Figure 16, wherein the web W is provided with a printed pattern extending from dashed line 96 to dashed line 98. The trimming rolls 94, previously referred to, trim off from each side of the web a strip 100 along a line 102 that is a fixed distance outwardly from the adjacent edge of the pattern, indicated by lines 96 and 98.

When the trimmed web is mounted in the trimming and slitting machine, it engages a feeler arm mounted in the machine frame closely adjacent laterally shiftable roller 18. This feeler arm is indicated in Figure 10, and the arrangement will be seen to consist of a mounting panel 104 on which is carried a coil 106 and reciprocably mounted on coil 106 is an armature 108 biased in one direction by a spring 110.

Pivotally mounted on plate 104 by post 112 is the feeler arm 114 that has an arcuate end 116 bearing on the edge of the web with a light pressure, say, one-half ounce.

Adjustably mounted on the arm, as by means of slot 118, is a plate 120 pivotally supporting a block 122 to which is connected rod 124 leading to armature 108.

It will be apparent that movements of the web in the machine frame will be accompanied by movements of feeler arm 114 about its pivotal support, and a corresponding adjustment of armature 108 in coil 106.

Figure 13:
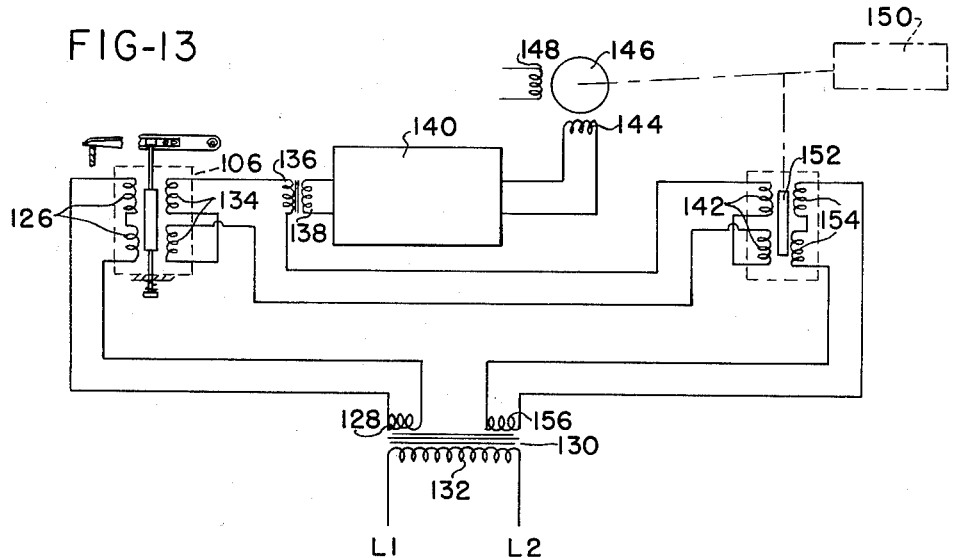
Figure 13 is a diagrammatic representation of the electric control circuit associated with the feeler.

The movement of armature 108 in coil 106 is converted into a usable electrical impulse in the manner diagrammatically illustrated in Figure 13. In this figure it will be noted that coil 106 is, in fact, a plurality of coils, with the two numbered 126 being connected in series and supplied with energy from secondary coil 128 of a transformer 130 having a primary 132 connected with power lines L1 and L2.

The amplifier output is delivered to field coil 144 of reversible motor 146 having a second field coil 148 with a constant input, and the drive shaft of motor 146 is connected for adjusting a hydraulic control valve 150 and is also connected with armature 152 associated with coils 142.

Armature 152 is also positioned to influence the serially connected coils 154 that are supplied from secondary coil 156 of transformer 130.

At this time it will be seen that what Figure 13 illustrates is an extremely delicate electrically operated detector that controls a servo-valve, and the adjustment of the servo-valve operating to restore balance in the electric circuit.

A typical arrangement of motor 146, valve 150, and the connected armature 152 is illustrated in Figure 14, and it will be noted that the valve 150 is connected between the hydraulic motor which it controls and a source of fluid pressure 160. Shifting of the valve in one direction will drive the motor piston in one direction, whereas shifting of the valve in the opposite direction will drive the piston in the opposite direction, and the valve further has a neutral position wherein the piston is locked stationary.

As mentioned before, one of the feeler arms is carried by the frame and engages the edge of the web adjacent roller 18. This feeler is indicated at 162 and controls hydraulic valve 164 associated with fluid motor 30. Inasmuch as the feeler arm is mounted on a bracket fixed in the frame, it will be apparent that it serves to control the position of the web in the frame, so that the edge of the web that is engaged by the feeler arm is always running in a fixed vertical plane. This locating of the web in the machine insures that the knife holders will take a minimum amount of movement in following the cutting line and also simplifies the mounting of the roll of material to be cut in the machine.

At the cutting and slitting end of the machine, there is a first feeler arm 166 positioned to engage the right-hand edge of the web as it is viewed in Figure 4 and mounted to move with adjacent slide 56. Feeler arm 166 controls hydraulic valve 168, which is connected to supply the cylinder 72 associated with right-hand slide 56. Inasmuch as feeler arm 166 is mounted to move with its associated slide, it will be apparent that the slide and feeler arm will shift back and forth laterally in the machine, so as to follow the edge of the web.

At the left edge of the web is another feeler arm 170 that controls a hydraulic valve 172 connected with cylinder 72 associated with left-hand slide 56, and this is also a follow-up arrangement with the slide and the feeler arm shifting laterally in the machine to follow the edge of the web.

From the foregoing description, it will be apparent that the device according to my invention operates as follows: a web is first run through a printing machine, and simultaneously is trimmed on its opposite edges a predetermined and fixed distance outwardly from the opposite edges of the pattern printed thereon.

The printed and roughly trimmed web is then placed in the slitting and trimming machine and threaded therethrough. As soon as the machine is started, and which is accomplished by energizing a motor M that is connected with one or both of rollers 24, and which is also connected through a speed reducer 180 with shaft 70, the feeler arm 162 becomes effective for predetermining the lateral position of the web in the machine.

Thereafter feeler arms 166 and 170 serve to control the two outer knife carriages to maintain their knives a predetermined fixed distance inwardly from the outer edges of the web being trimmed, with the center knife occupying a precisely centered position between the outer knives and slitting the web in half.

Each of the knives can be adjusted laterally independently of the others, and the machine is thus made to conform to patterns of slightly varying width and to compensate for variations in the structure in individual knives.

Preferably each knife is made as illustrated in Figure 9, wherein it will be seen that the cutting blade is double edged and is supported in the plane of the centerline of its supporting arm. This permits use of both edges of the blade merely by turning the arm over.

Figure 17:
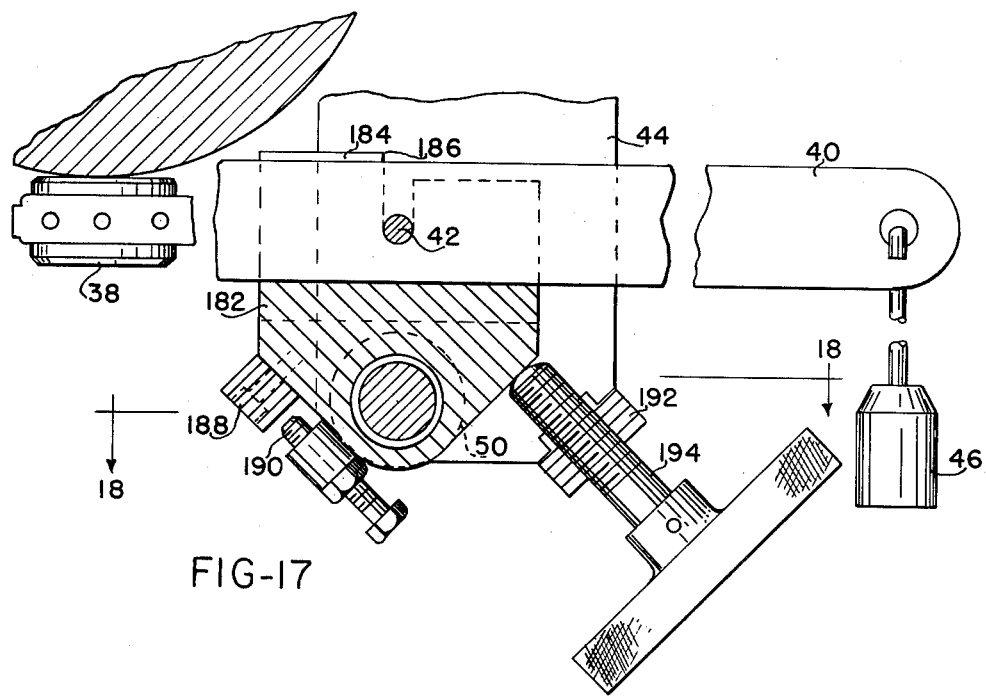
Figure 17 is a longitudinal sectional view through one of the knife holders.
Figure 18:
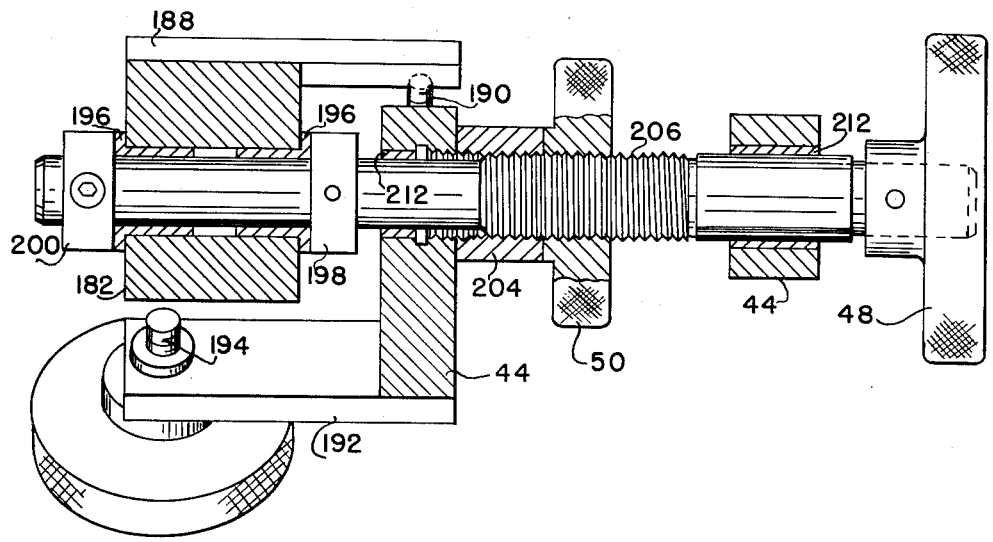
Figure 18 is a sectional view indicated by line 18—18 on Figure 17 showing details of construction of the knife holder.

Figures 17 and 18 will show that each arm 40 is received in slot 184 in a block 182 which also has a slot 186 to receive pin 42 of the arm.

Each block 182 is pivotally supported on a rod 187 supported in bracket 44 and a stop screw 190 and bar 188 limit tilting movement of the block in one direction while stop screw 194 limits tilting movement thereof in the other direction. Sleeve bearings 196 support block 182 on the rod while collar 198 and 200 hold it in a fixed position axially of the rod.

Bracket 44 has a threaded boss or sleeve 204 fixed thereto that receives threaded part 206 of rod 187 and the clamp nut 50 serves to lock the rod in any adjusted position in the bracket, the handwheels 48, of course, being availed of to turn the rods for effecting the adjustment thereof.

Bearings 212 support the rod 187 in the bracket 44 and hold it in rigid axial alignment so the cutter blade 38 on arm 40 is always presented perpendicularly to the web.

The described arm supporting arrangement provides for precise independent adjustment of the cutter transversely of the web to accommodate the machine to the various pattern printed thereon.

It will be understood that this invention is susceptible to modification in order to adapt it to different usages and conditions, and, accordingly, it is desired to comprehend such modifications within this invention as may fall within the scope of the appended claims.

I claim:

1. A method of accurately dimensioning the width of a printed web which is subjected to dimensional changes as a result of printing the same which comprises the steps of printing a pattern of substantially constant width on the web, trimming each side edge longitudinally along a straight line a predetermined distance outwardly from each edge of said printing pattern, allowing the resultant printed and trimmed web to assume final dimensions, again trimming each edge of the web a predetermined distance inwardly from the previously trimmed edge and using the same as a guide, and slitting the web longitudinally at its center while simultaneously detecting lateral deviations of each of said trimmed edges and automatically controlling the location of said center slitting in response to deviations of said side edges of the web to maintain the center slit equidistant from said side edges.

2. A method of accurately dimensioning the width of a web having a printed pattern thereon of less width than said web, and which is subjected to dimensional changes, comprising trimming each side edge longitudinally along a straight line a predetermined distance outwardly from each edge of said printing pattern, allowing the resultant trimmed printed web to assume final dimensions, again trimming each edge of the web a predetermined distance inwardly from the previously trimmed edge and using the same as a guide, and slitting the web longitudinally at its center while simultaneously detecting lateral deviations of each of said trimmed edges and automatically controlling the location of said center slitting in response to deviations of said side edges of the web to maintain the center slit equidistant from said side edges.

References Cited in the file of this patent

UNITED STATES PATENTS

| Number | Name | Date |
|---|---|---|
| 271,782 | Buchanan | Feb. 6, 1883 |
| 690,822 | Arvil | Jan. 7, 1902 |
| 1,029,021 | Marsh et al. | June 11, 1912 |
| 1,935,708 | Gurwick | Nov. 21, 1933 |
| 2,090,158 | Smith | Aug. 17, 1937 |
| 2,151,028 | Hayward | Mar. 21, 1939 |
| 2,366,331 | Harless | Jan. 2, 1945 |
| 2,454,003 | Pamphilon | Nov. 16, 1948 |
| 2,477,128 | Hope | July 26, 1949 |
| 2,545,260 | Cole | Mar. 13, 1951 |
| 2,573,563 | Gardiner | Oct. 30, 1951 |